(12) United States Patent
Uratani et al.

(10) Patent No.: US 8,456,709 B2
(45) Date of Patent: Jun. 4, 2013

(54) IMAGE PROCESSING APPARATUS, IMAGE PROCESSING METHOD, AND LOOKUP TABLE GENERATION METHOD

(75) Inventors: Mitsuru Uratani, Kawasaki (JP); Yumi Yanai, Kawasaki (JP); Shinichi Miyazaki, Kawasaki (JP); Toshiki Miyazaki, Tokyo (JP); Hiroshi Mori, Yokohama (JP); Yoshikazu Ishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 12/942,778

(22) Filed: Nov. 9, 2010

(65) Prior Publication Data
US 2011/0116137 A1    May 19, 2011

(30) Foreign Application Priority Data
Nov. 17, 2009  (JP) .................... 2009-262369

(51) Int. Cl.
  *H04N 1/60* (2006.01)
  *H04N 1/40* (2006.01)
  *G03F 3/08* (2006.01)

(52) U.S. Cl.
  USPC ............ 358/3.23; 358/1.9; 358/518; 358/522

(58) Field of Classification Search
  USPC ............... 358/1.9, 1.16, 3.23, 1.15, 518, 519, 358/520, 521, 522, 523, 524, 525
  See application file for complete search history.

(56) References Cited

U.S. PATENT DOCUMENTS

| 5,644,509 | A | 7/1997 | Schwartz |
| 7,355,750 | B2 | 4/2008 | Saito et al. |
| 7,365,890 | B2 | 4/2008 | Saito et al. |
| 7,460,115 | B2 | 12/2008 | Asao et al. |
| 2008/0151276 | A1 | 6/2008 | Mori |
| 2009/0046107 | A1 | 2/2009 | Asao et al. |
| 2009/0296109 | A1* | 12/2009 | Maltz et al. ............... 358/1.9 |
| 2009/0296153 | A1* | 12/2009 | Wang et al. ............... 358/3.01 |
| 2010/0039011 | A1 | 2/2010 | Karaki et al. |
| 2010/0157341 | A1 | 6/2010 | Mori |

FOREIGN PATENT DOCUMENTS

| JP | 5-502781 | 5/1993 |
| JP | 8-194817 | 7/1996 |
| JP | 2004-172809 | 6/2004 |
| JP | 2006-211578 | 8/2006 |
| WO | 92-06557 | 4/1992 |

OTHER PUBLICATIONS

English translation of Japanese Office Action dated Mar. 23, 2012 in Japanese Application No. JP 2010/257301.

* cited by examiner

*Primary Examiner* — Jerome Grant, II
(74) *Attorney, Agent, or Firm* — Fitzpatrick, Cella, Harper & Scinto (57) ABSTRACT

Using a first lookup table used to convert color data on a device-independent color space into color data on a device-dependent color space, and a second lookup table used to convert the color data on the device-dependent color space into color material data corresponding to a plurality of color print materials, the image processing apparatus acquires output values using the first lookup table in accordance with input values the number of which is larger than the number of grid points of the first lookup table, acquires output values using the second lookup table, as input values, the output values acquired, and generates a third lookup table corresponding to the predetermined number of input values which is larger than the number of grid points of the first lookup table in accordance with the output values acquired.

9 Claims, 11 Drawing Sheets

| Input | | | Output | | |
|---|---|---|---|---|---|
| R | G | B | R' | G' | B' |
| 0 | 0 | 0 | 0 | 0 | 0 |
| 0 | 0 | 51 | 11 | 4 | 69 |
| 0 | 0 | 102 | 24 | 8 | 115 |
| 0 | 0 | 153 | 22 | 7 | 158 |
| 0 | 0 | 204 | 13 | 4 | 201 |
| 0 | 0 | 255 | 24 | 11 | 244 |
| ... | ... | ... | ... | ... | ... |
| 102 | 51 | 0 | 125 | 64 | 14 |
| 102 | 51 | 51 | 120 | 62 | 70 |
| 102 | 51 | 102 | 126 | 47 | 124 |
| 102 | 51 | 153 | 129 | 43 | 184 |
| 102 | 51 | 204 | 118 | 49 | 240 |
| 102 | 51 | 255 | 124 | 42 | 254 |
| ... | ... | ... | ... | ... | ... |
| 255 | 255 | 0 | 251 | 247 | 0 |
| 255 | 255 | 51 | 255 | 249 | 12 |
| 255 | 255 | 102 | 255 | 249 | 38 |
| 255 | 255 | 153 | 255 | 247 | 90 |
| 255 | 255 | 204 | 255 | 247 | 167 |
| 255 | 255 | 255 | 255 | 255 | 255 |

FIG. 6B (602)

| Input | | | Output | | | |
|---|---|---|---|---|---|---|
| R' | G' | B' | C | M | Y | K |
| 0 | 0 | 0 | 0 | 0 | 0 | 255 |
| 0 | 0 | 51 | 104 | 125 | 0 | 112 |
| 0 | 0 | 102 | 168 | 180 | 0 | 46 |
| 0 | 0 | 153 | 171 | 180 | 0 | 21 |
| 0 | 0 | 204 | 164 | 171 | 0 | 9 |
| 0 | 0 | 255 | 160 | 166 | 0 | 5 |
| ... | ... | ... | ... | ... | ... | ... |
| 102 | 51 | 0 | 25 | 94 | 187 | 40 |
| 102 | 51 | 51 | 57 | 135 | 114 | 0 |
| 102 | 51 | 102 | 62 | 138 | 62 | 0 |
| 102 | 51 | 153 | 65 | 129 | 27 | 0 |
| 102 | 51 | 204 | 67 | 121 | 11 | 0 |
| 102 | 51 | 255 | 64 | 115 | 0 | 0 |
| ... | ... | ... | ... | ... | ... | ... |
| 255 | 255 | 0 | 0 | 0 | 178 | 0 |
| 255 | 255 | 51 | 0 | 0 | 96 | 0 |
| 255 | 255 | 102 | 0 | 0 | 58 | 0 |
| 255 | 255 | 153 | 0 | 0 | 32 | 0 |
| 255 | 255 | 204 | 0 | 0 | 14 | 0 |
| 255 | 255 | 255 | 0 | 0 | 0 | 0 |

FIG. 7

| | | | | | | |
|---|---|---|---|---|---|---|
| GRID POINT POSITION OF R AXIS | 0 | 51 | 102 | 153 | 204 | 225 |
| GRID POINT POSITION OF G AXIS | 0 | 51 | 102 | 153 | 204 | 225 |
| GRID POINT POSITION OF B AXIS | 0 | 51 | 102 | 153 | 204 | 225 |

OUTPUT VALUES AT RESPECTIVE GRID POINT POSITIONS

| R' | G' | B' |
|---|---|---|
| 0 | 0 | 0 |
| 11 | 4 | 69 |
| 24 | 8 | 115 |
| 22 | 7 | 158 |
| 13 | 4 | 201 |
| 24 | 11 | 244 |
| ... | ... | ... |
| 125 | 64 | 14 |
| 120 | 62 | 70 |
| 126 | 47 | 124 |
| 129 | 43 | 184 |
| 118 | 49 | 240 |
| 124 | 42 | 254 |
| ... | ... | ... |
| 251 | 247 | 0 |
| 255 | 249 | 12 |
| 255 | 249 | 38 |
| 255 | 247 | 90 |
| 255 | 247 | 167 |
| 255 | 255 | 255 |

| Quality | NUMBER OF GRID POINTS | GRID POINT POSITIONS (COMMON TO RGB) |
|---|---|---|
| Standard | 16 | 0, 17, 34, 51, 68, 85, 102, 119, 136, 153, 170, 187, 204, 221, 238, 255 |
| High | 16 | 0, 17, 34, 51, 68, 85, 102, 119, 136, 153, 170, 187, 204, 221, 238, 255 |
| Highest | 32 | 0, 8, 16, 24, 33, 41, 49, 57, 66, 74, 82, 90, 99, 107, 115, 123, 132, 140, 148, 156, 165, 173, 181, 189, 198, 206, 214, 222, 231, 239, 247, 255 |

| Input | | | Output | | |
|---|---|---|---|---|---|
| R | G | B | R' | G' | B' |
| 0 | 0 | 0 | 0 | 0 | 0 |
| 0 | 0 | 17 | 3 | 1 | 23 |
| 0 | 0 | 34 | 7 | 2 | 46 |
| 0 | 0 | 51 | 11 | 4 | 69 |
| 0 | 0 | 68 | 15 | 5 | 84 |
| 0 | 0 | 85 | 19 | 6 | 100 |
| ... | ... | ... | ... | ... | ... |
| 255 | 255 | 170 | 251 | 247 | 116 |
| 255 | 255 | 187 | 255 | 247 | 141 |
| 255 | 255 | 204 | 255 | 247 | 167 |
| 255 | 255 | 221 | 255 | 250 | 197 |
| 255 | 255 | 238 | 255 | 253 | 226 |
| 255 | 255 | 255 | 255 | 255 | 255 |

NUMBER OF GRID POINTS=16

| Input | | | Output | | | |
|---|---|---|---|---|---|---|
| R' | G' | B' | C | M | Y | K |
| 0 | 0 | 0 | 0 | 0 | 0 | 255 |
| 3 | 1 | 23 | 43 | 58 | 1 | 189 |
| 7 | 2 | 46 | 84 | 117 | 3 | 122 |
| 11 | 4 | 69 | 112 | 143 | 3 | 85 |
| 15 | 5 | 84 | 125 | 159 | 4 | 65 |
| 19 | 6 | 100 | 139 | 176 | 5 | 43 |
| ... | ... | ... | ... | ... | ... | ... |
| 255 | 247 | 116 | 0 | 3 | 50 | 0 |
| 255 | 247 | 141 | 0 | 3 | 38 | 0 |
| 255 | 247 | 167 | 0 | 3 | 27 | 0 |
| 255 | 250 | 197 | 0 | 1 | 16 | 0 |
| 255 | 253 | 226 | 0 | 0 | 7 | 0 |
| 255 | 255 | 255 | 0 | 0 | 0 | 0 |

| Input | | | Output | | | |
|---|---|---|---|---|---|---|
| R | G | B | C | M | Y | K |
| 0 | 0 | 0 | 0 | 0 | 0 | 255 |
| 0 | 0 | 17 | 43 | 58 | 1 | 189 |
| 0 | 0 | 34 | 84 | 117 | 3 | 122 |
| 0 | 0 | 51 | 112 | 143 | 3 | 85 |
| 0 | 0 | 68 | 125 | 159 | 4 | 65 |
| 0 | 0 | 85 | 139 | 176 | 5 | 43 |
| ⋮ | ⋮ | ⋮ | ⋮ | ⋮ | ⋮ | ⋮ |
| 255 | 255 | 170 | 0 | 3 | 50 | 0 |
| 255 | 255 | 187 | 0 | 3 | 38 | 0 |
| 255 | 255 | 204 | 0 | 3 | 27 | 0 |
| 255 | 255 | 221 | 0 | 1 | 16 | 0 |
| 255 | 255 | 238 | 0 | 0 | 7 | 0 |
| 255 | 255 | 255 | 0 | 0 | 0 | 0 |

NUMBER OF GRID POINTS=16 (applies to first six rows)

| Input | | | Output | | | |
|---|---|---|---|---|---|---|
| R | G | B | C | M | Y | K |
| 0 | 0 | 0 | 0 | 0 | 0 | 255 |
| 0 | 0 | 51 | 112 | 143 | 3 | 85 |
| 0 | 0 | 102 | 137 | 175 | 3 | 35 |
| 0 | 0 | 153 | 145 | 175 | 2 | 16 |
| 0 | 0 | 204 | 150 | 169 | 0 | 8 |
| 0 | 0 | 255 | 132 | 149 | 0 | 1 |
| ⋮ | ⋮ | ⋮ | ⋮ | ⋮ | ⋮ | ⋮ |
| 255 | 255 | 0 | 1 | 3 | 180 | 0 |
| 255 | 255 | 51 | 0 | 2 | 158 | 0 |
| 255 | 255 | 102 | 0 | 2 | 116 | 0 |
| 255 | 255 | 153 | 0 | 3 | 67 | 0 |
| 255 | 255 | 204 | 0 | 3 | 27 | 0 |
| 255 | 255 | 255 | 0 | 0 | 0 | 0 |

NUMBER OF GRID POINTS=6 (applies to first six rows)

F I G. 13

| | Input | | | Output | | | | Diff.from Seq. | | | |
|---|---|---|---|---|---|---|---|---|---|---|---|
| | R | G | B | C | M | Y | K | dC | dM | dY | dK |
| Sequential 6grid | 30 | 70 | 160 | 102 | 98 | 14 | 0 | – | – | – | – |
| Comp.Table 6grid | | | | 109 | 99 | 12 | 0 | 7 | 1 | –2 | 0 |
| Comp.Table 16grid | | | | 103 | 98 | 13 | 0 | 1 | 0 | –1 | 0 |

IMAGE PROCESSING APPARATUS, IMAGE PROCESSING METHOD, AND LOOKUP TABLE GENERATION METHOD

BACKGROUND OF THE INVENTION

1. Field of the Invention

The present invention relates to an image processing apparatus and an image processing method, which apply color conversion processes to image data, and a lookup table generation method.

2. Description of the Related Art

Upon outputting an image in an image processing apparatus, it is a common practice to convert input image data expressed on a device-independent color space such as an sRGB space into image data expressed on a device-dependent color space which can be reproduced by an image output unit.

In this case, an apparatus of a CMYK color system such as a printer has to further convert the image data on the device-dependent color space into data of color material colors represented by inks or toners. Furthermore, after the conversion into the color material color data, conversion required to correct tone characteristics to fit those of an apparatus in an output unit is often required.

In the aforementioned case, in order to generate output data from input data, a conversion process from data expressed on a device-independent color space into data expressed on a device-dependent color space is executed first. Then, a conversion process from the data expressed on the device-dependent color space into color material color data is executed. Finally, a conversion process required to correct the tone characteristics of the color material color data is executed. In this way, the three stages of color conversion processes are executed in turn.

Upon sequentially processing such large number of color conversion processes, corresponding conversion mechanisms have to be prepared, and a time is required to execute all these conversion processes. In order to solve this problem, a method of combining the plurality of conversion processes into one process has been proposed (Japanese Patent Laid-Open No. 05-502781).

In case of a conversion process which has a strong nonlinearity and is hardly expressed by unique mathematical expressions, a color conversion method using a lookup table (LUT) is generally used. In this case, the LUT is a table which defines input colors and corresponding output colors. The LUT defines the predetermined number of grids on a predetermined color space before color conversion, and stores colors after color conversion at these grid points. For example, when input data is defined on an RGB color space and output data is defined on a CMYK color space, if R, G, and B values corresponding to each grid point are input, four C, M, Y, and K values stored in correspondence with that point are output. When a color which does not correspond to any grid point of the LUT is input, it is a common practice to calculate an output value by linear interpolation such as tetrahedral interpolation from surrounding grid points or interpolation based on other nonlinear functions.

When the nonlinearities of color spaces before and after color conversion are strong, the number of grid points has to be increased to attain conversion with sufficiently high precision. As a result, the capacity of a memory or HDD required to store such LUT is increased. In order to solve this problem, for example, a method of unevenly designating grid intervals to have dense grid intervals for an area important in a color conversion process has been proposed (Japanese Patent Laid-Open No. 08-194817).

However, when the LUTs having the strong nonlinearities are combined as in Japanese Patent Laid-Open No. 05-502781, the nonlinearities are further enhanced. As a result, compared to sequential execution of the color conversion processes, the interpolation precision may drop, thereby decreasing the conversion precision. Also, in order to generate a LUT having uneven intervals as in Japanese Patent Laid-Open No. 08-194817, complicated processes are required, and hardware or software required to generate such LUT has to be configured and operated. Upon combining LUTs having uneven intervals, when important areas on the respective LUTs to be combined are different, and grid point intervals are used in correspondence with one of these LUTs, the important area of another LUT cannot be covered. As a result, the conversion precision after combination unwantedly drops.

SUMMARY OF THE INVENTION

An aspect of the present invention is to eliminate the above-mentioned problems with the conventional technology. The present invention provides an image processing apparatus and an image processing method, which execute a plurality of color conversion processes by a simple arrangement while maintaining high color conversion precision, and a lookup table generation method.

The present invention in its first aspect provides a lookup table generation method for generating a third lookup table by using a first lookup table and a second lookup table, comprising: a first acquisition step of acquiring output values, using the first lookup table for converting color data on a device-independent color space into color data on a device-dependent color space, in accordance with input values the number of which is larger than the number of grid points of the first lookup table; a second acquisition step of acquiring output values, using the second lookup table for converting the color data on the device-dependent color space into color material data corresponding to a plurality of color print materials, upon setting, as input values, the output values acquired in the first acquisition step; and a generation step of generating the third lookup table, having grid points a predetermined number of which is larger than the number of grid points of the first lookup table, corresponding to the predetermined number of input values in accordance with the output values acquired in the second acquisition step.

The present invention in its second aspect provides an image processing method for applying color conversion processes to image data, comprising: a generation step of generating a third lookup table by using a first lookup table and a second lookup table; and a color conversion step of applying the color conversion processes to the image data using the third lookup table generated in the generation step, wherein the generation step includes a first acquisition step of acquiring output values, using the first lookup table for converting color data on a device-independent color space into color data on a device-dependent color space, in accordance with input values the number of which is larger than the number of grid points of the first lookup table, a second acquisition step of acquiring output values, using the second lookup table for converting the color data on the device-dependent color space into color material data corresponding to a plurality of color print materials, upon setting, as input values, the output values acquired in the first acquisition step, and a generation step of generating the third lookup table, having grid points a predetermined number of which is larger than the number of grid points of the first lookup table, corresponding to the predetermined number of input values in accordance with the output values acquired in the second acquisition step.

The present invention in its third aspect provides an image processing apparatus which applies color conversion processes to image data, comprising: a generation unit configured generate a third lookup table by using a first lookup table and a second lookup table; and a color conversion unit configured to apply the color conversion processes to the image data using the third lookup table generated by the generation unit, wherein the generation unit acquires first output values, using the first lookup table for converting color data on a device-independent color space into color data on a device-dependent color space, in accordance with input values the number of which is larger than the number of grid points of the first lookup table, acquires second output values, using the second lookup table for converting the color data on the device-dependent color space into color material data corresponding to a plurality of color print materials, upon setting the first output values as input values, and then generates the third lookup table, having grid points a predetermined number of which is larger than the number of grid points of the first lookup table, corresponding to the predetermined number of input values in accordance with the second output values.

According to the present invention, a plurality of color conversion processes can be executed by a simple arrangement while maintaining high conversion precision.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same components throughout the drawings, and a repetitive description thereof will be avoided.

Figure 1:
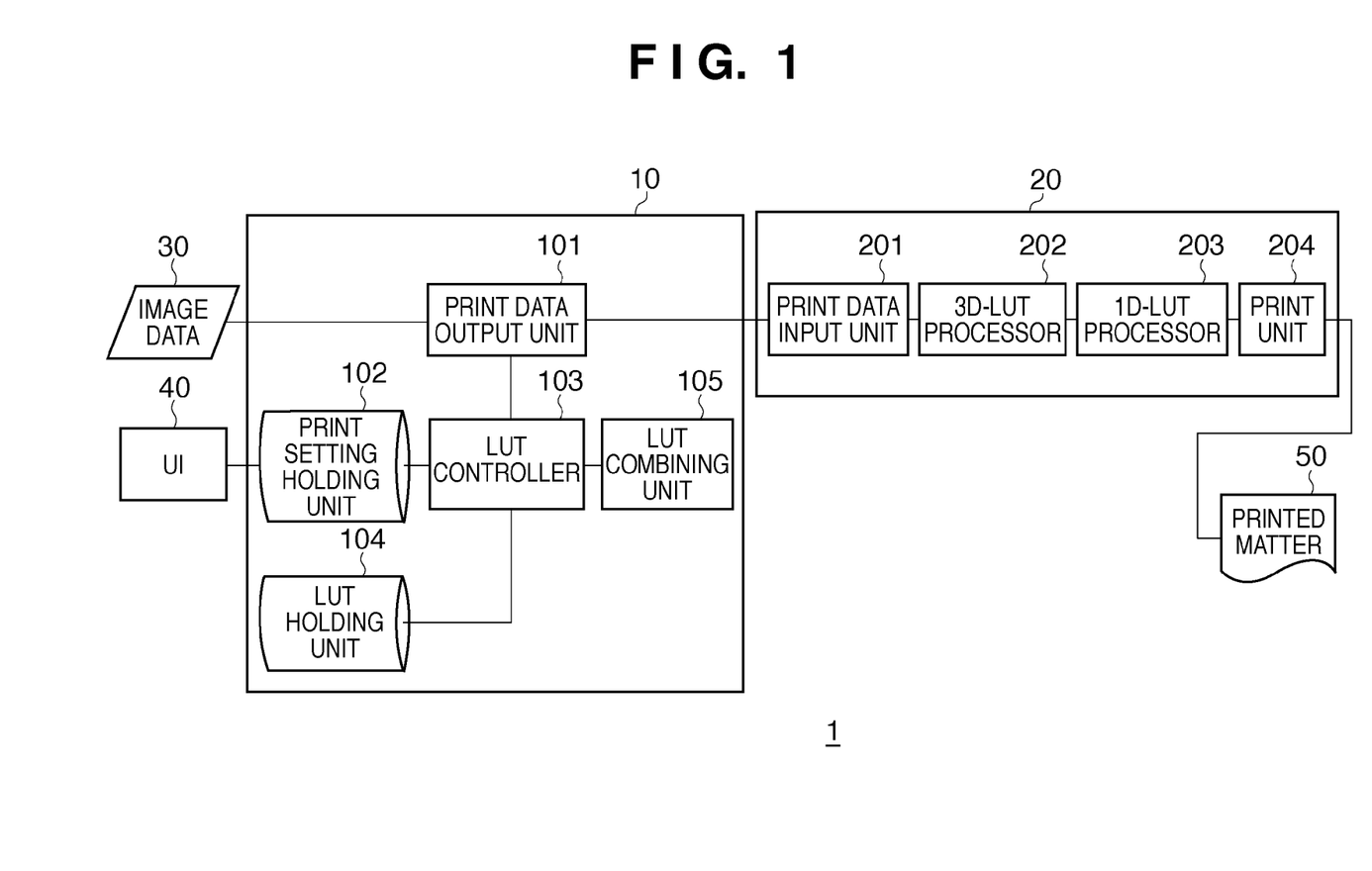
FIG. 1 is a block diagram showing the arrangement of an image processing apparatus according to an embodiment of the present invention.

FIG. 1 is a block diagram showing the arrangement of an image processing apparatus according to an embodiment of the present invention. Color conversion processes executed in the image processing apparatus of this embodiment include a color matching process, a color separation process, and a tone correction process. The color matching process converts color data on a device-independent color space into color data on a device-dependent color space which is defied by an RGB color system. The color separation process converts the color data on the device-dependent color space into color material data corresponding to a plurality of color print materials. The tone correction process corrects the color material data to fit the characteristics of an output apparatus. Of these color conversion processes, lookup tables (LUTs) of the color matching process and color separation process are combined to generate one 3D-LUT, thus applying the color conversion processes.

An image processing apparatus 1 includes a print data generation unit 10 and image output unit 20. The print data generation unit 10 and image output unit 20 may be connected via a network or an interface such as USB or a local bus.

Figure 2:
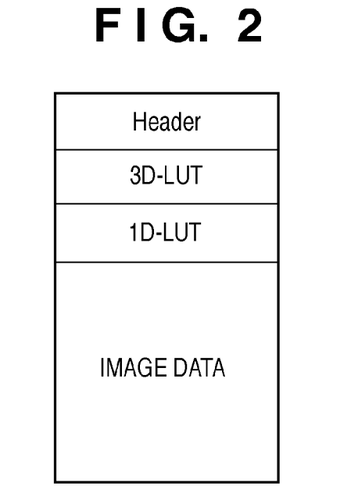
FIG. 2 is a view showing an example of print data used in the image processing apparatus shown in FIG. 1.
Figure 5:
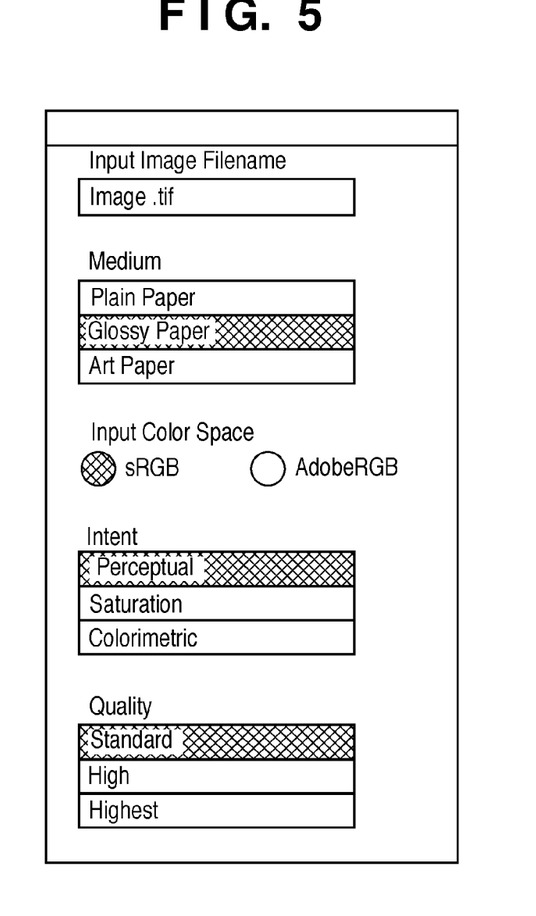
FIG. 5 is a view showing an example of a user interface screen.

The print data generation unit 10 further includes a print data output unit 101, print setting holding unit 102, LUT controller 103, LUT holding unit 104, and LUT combining unit 105, and sends image data 30 and a combined LUT to the image output unit 20 in the format of print data shown in FIG. 2. The print data output unit 101 generates the print data shown in FIG. 2 from a 3D-LUT and 1D-LUT input from the LUT controller 103, and the image data 30, and outputs the print data to the image output unit 20. The print setting holding unit 102 holds print settings set on a user interface (UI) 40 by the user. FIG. 5 shows an example of the UI 40 of this embodiment. As shown in FIG. 5, the user can set a print mode in correspondence with information such as a file name of the input image data, a printing medium used in an output process, definition of a color space of the input image data, a gamut mapping type in color matching, and a print quality.

The LUT controller 103 acquires LUTs from the LUT holding unit 104 based on the print settings held in the print setting holding unit 102, then controls the LUT combining unit 105 to combine the acquired LUTs, and sends the combined LUT to the print data output unit 101. The LUT holding unit 104 holds LUTs used at the time of printing. The LUT combining unit 105 combines LUTs in accordance with an instruction from the LUT controller 103, and sends the combined LUT to the LUT controller 103.

The image output unit 20 includes a print data input unit 201, 3D-LUT processor 202, 1D-LUT processor 203, and print unit 204. The image output unit 20 extracts image data from the incoming print data, and prints the image data by applying LUTs extracted from the print data to that image data. The print data input unit 201 decomposes the print data sent from the print data generation unit 10 into a 3D-LUT, 1D-LUT, and image data. The print data input unit 201 sets the LUTs respectively in the 3D-LUT processor 202 and 1D-LUT processor 203, and sends the image data to the 3D-LUT processor 202. The 3D-LUT processor 202 executes color conversion of the incoming image data using the LUT set by the print data input unit 201, and sends the conversion result to the 1D-LUT processor 203.

The 1D-LUT processor 203 executes color conversion of the incoming image data using the LUT set by the print data input unit 201, and sends the conversion result to the print unit 204. The print unit 204 executes a print process using the incoming image data, and outputs a printed matter 50. Note that printing can be implemented by a known method, and a detailed description thereof will not be given.

The image processing apparatus 1 includes a CPU (not shown), which controls the operation of the overall image processing apparatus 1. The CPU operates based on programs loaded from a ROM. Respective processes in the flowcharts to be described later are implemented when programs stored in the ROM or a RAM are read out, and are executed by the CPU.

Figure 3:
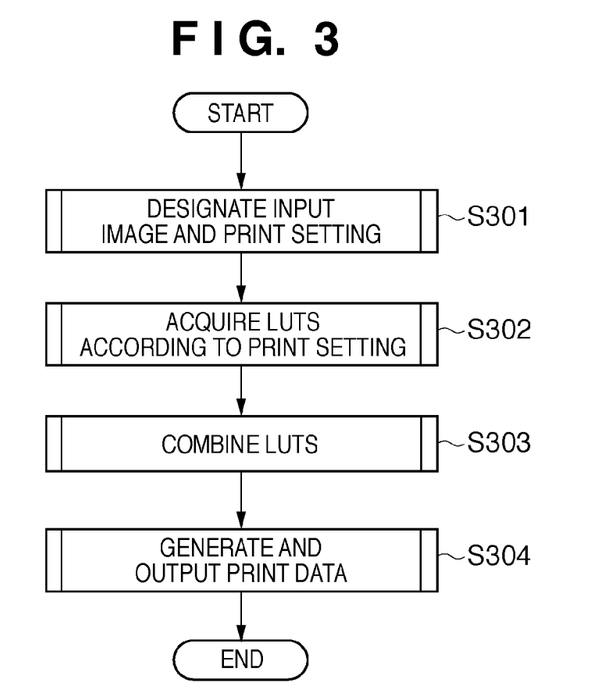
FIG. 3 is a flowchart showing the sequence of processing in a print data generation unit 10.

FIG. 3 is a flowchart showing the sequence of processing in the print data generation unit 10 according to the embodiment of the present invention. In step S301, the UI 40 accepts designation of input image data and inputs of print settings by the user, and stores the input result in the print setting holding unit 102. In step S302, the LUT controller 103 acquires LUTs used in printing from those stored in the LUT holding unit 104 based on the information stored in the print setting holding unit 102. In step S303, the LUT controller 103 sends information required for an LUT combining process stored in the print setting holding unit 102 and the LUTs acquired in step S302 to the LUT combining unit 105. The LUT combining unit 105 executes the combining process by a method to be described later. In step S304, the print data output unit 101 receives the LUTs acquired in step S302 and the LUT combined in step S303 from the LUT controller 103. The print data output unit 101 further acquires image data based on the file name stored in the print setting holding unit 102 to generate print data shown in FIG. 2, and outputs the print data to the image output unit 20.

Figure 4:
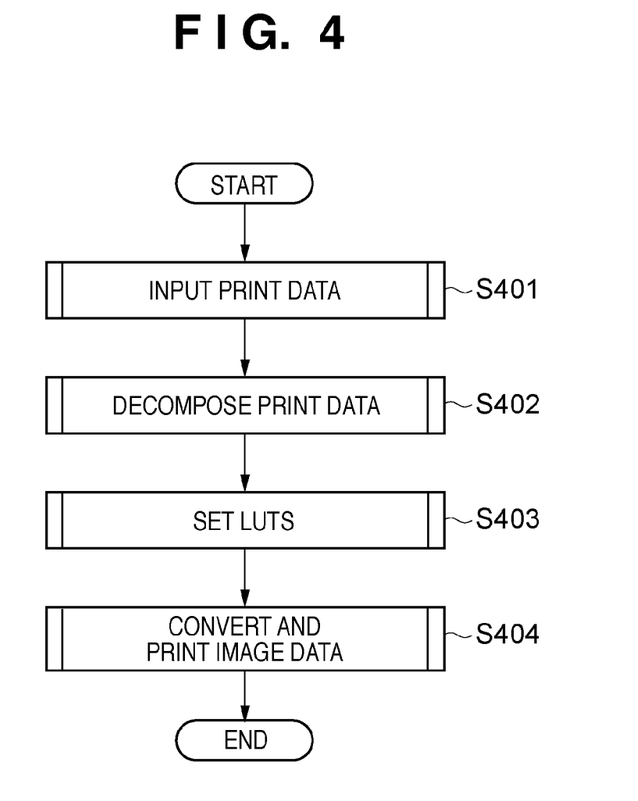
FIG. 4 is a flowchart showing the sequence of processing in an image output unit 20.

FIG. 4 is a flowchart showing the sequence of processing in the image output unit 20 of this embodiment. In step S401, the print data input unit 201 receives print data (shown in FIG. 2) sent from the print data generation unit 10. In step S402, the print data input unit 201 decomposes the received print data into LUTs and image data. In step S403, the print data input unit 201 respectively sets the decomposed LUTs in the 3D-LUT processor 202 and 1D-LUT processor 203. In step S404, the print data input unit 201 sequentially inputs the decomposed image data to the 3D-LUT processor 202 and 1D-LUT processor 203. The 3D-LUT processor 202 and 1D-LUT processor 203 respectively execute the color conversion processes. After the color conversion processes, the print unit 204 executes the print process using the image data that has undergone the color conversion processes.

Figure 6A:
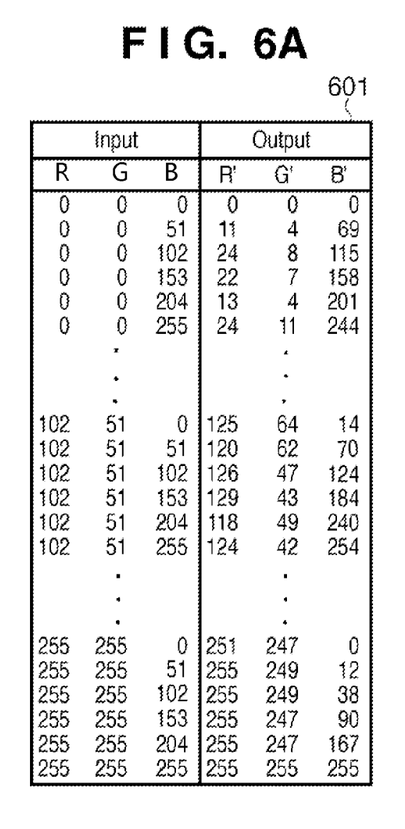
FIGS. 6A and 6B are views showing examples of 3D-LUTs in respective processes.
Figure 6B:
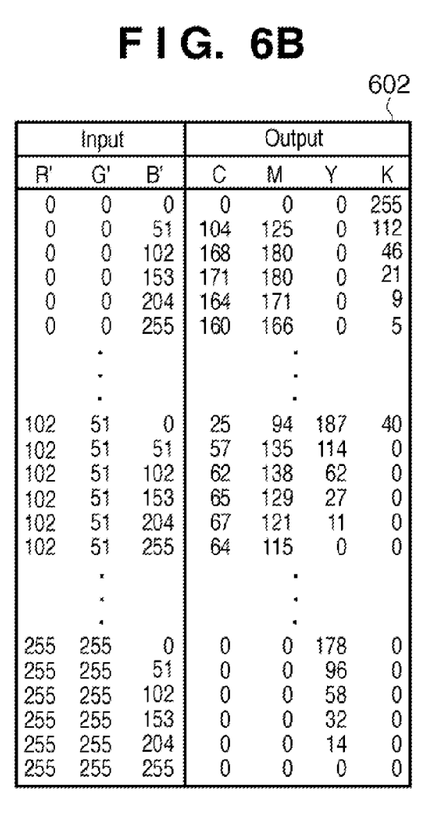
Figure 7:
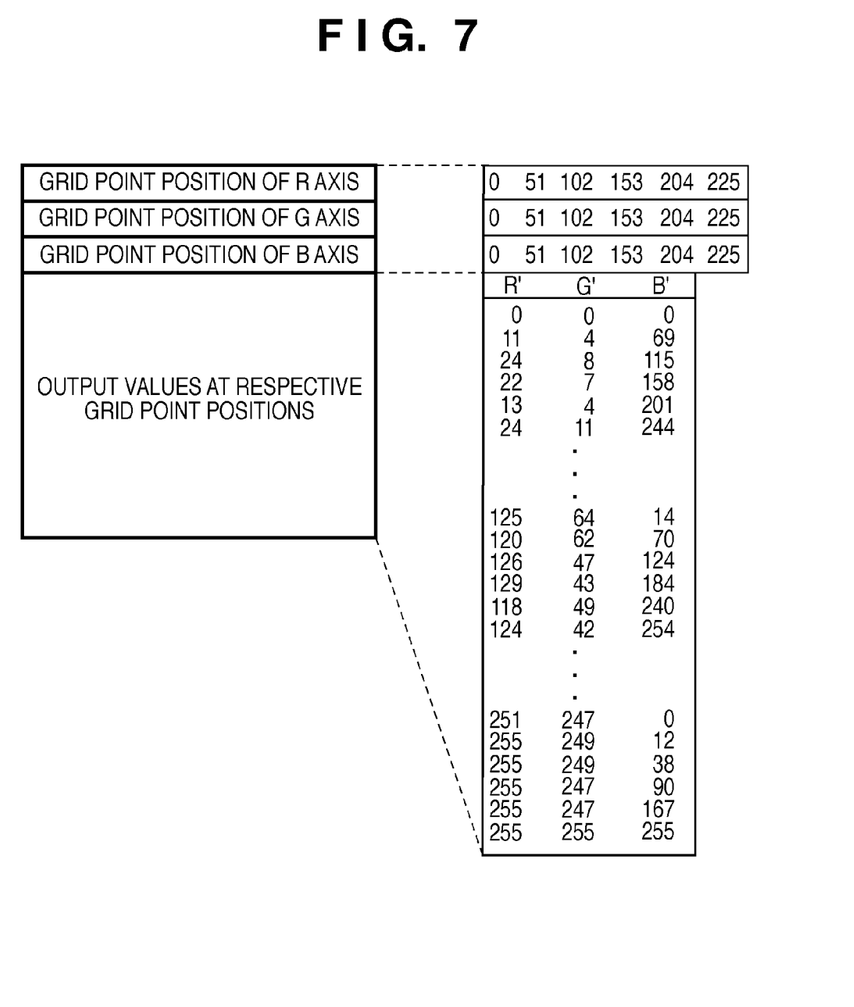
FIG. 7 is a view showing another example of a 3D-LUT in respective processes.

FIGS. 6A and 6B are views showing examples of 3D-LUTs of this embodiment. An LUT 601 shown in FIG. 6A is an example of a 3D-LUT (first lookup table) for the color matching process. An LUT 602 shown in FIG. 6B is an example of a 3D-LUT (second lookup table) for the color separation process. As shown in FIGS. 6A and 6B, the LUTs describe grid point positions of input coordinate systems, and those of output coordinate systems, which are associated with the grid point positions of the input coordinate systems. Note that FIGS. 6A and 6B describe all the grid point positions of the respective input coordinate systems in association with those of the output coordinate systems. However, the data size of the LUT may be reduced by describing only grid point positions for respective axes on the input coordinate system at the head of the LUT, as shown in FIG. 7. As the storage format of the LUT, for example, when the grid point positions are perfectly fixed for all input elements, a description about the grid point positions may be omitted, and only the grid point positions of the output coordinate system associated with them may be stored as output values. Note that the LUT storage format is not limited to the 3D-LUT, and the same applies to the 1D-LUT. These LUTs, which are prepared in accordance with the print mode corresponding to a printing medium and print quality set on the UI 40, are held in the LUT holding unit 104. Typical examples of the LUTs will be described below with reference to FIGS. 6A and 6B.

Figure 11:
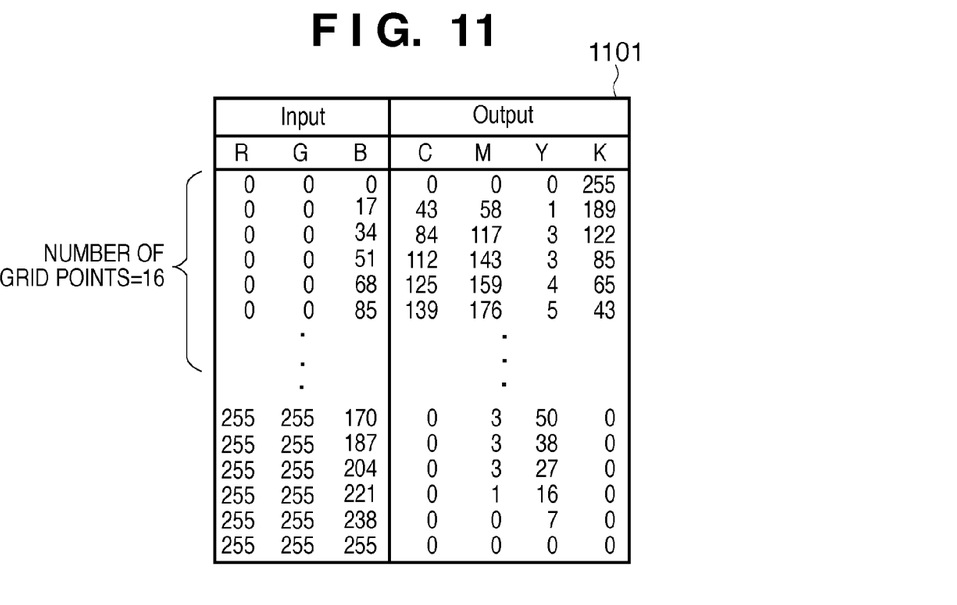
FIG. 11 is a view showing an example of a combined 3D-LUT.

The number of grid points of each 3D-LUT held in the LUT holding unit 104 is six per axis of a color space, as shown in FIGS. 6A and 6B. In this embodiment, as a result of the combining process of the two LUTs after the numbers of grid points of respective axes of the LUT 601 are increased with reference to a table shown in FIG. 9, a 3D-LUT which includes 16 grid points per axis, as shown in FIG. 11, is generated. These numbers of grid points may be arbitrarily set like 10 grids, 24 grids, 32 grids, and so forth depending on the memory capacity of the system, and the capabilities of the 3D-LUT processor 202 and 1D-LUT processor 203.

Figure 8:
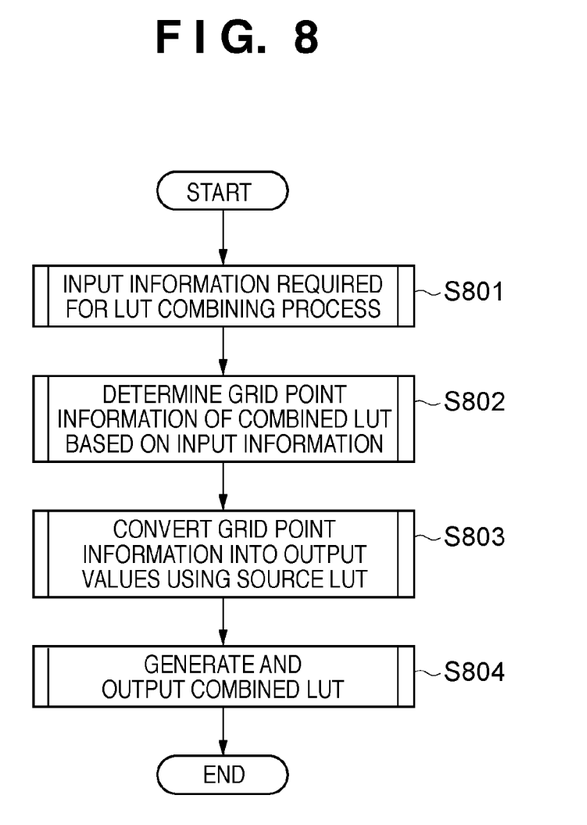
FIG. 8 is a flowchart showing the sequence of processing of an LUT combining unit 105.
Figure 9:
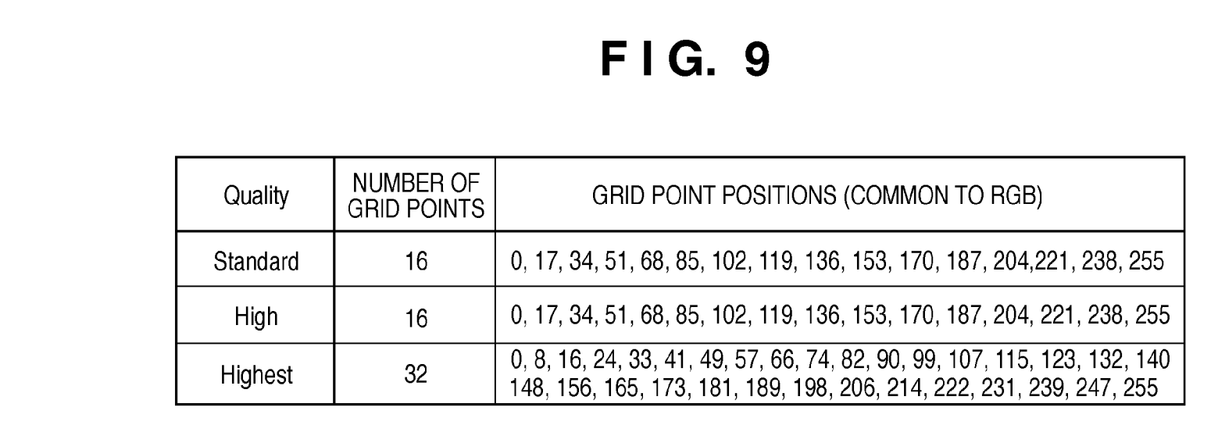
FIG. 9 shows tables used to determine the number of grid points and grid point position information.

FIG. 8 is a flowchart showing the sequence of processing of the LUT combining unit 105 of this embodiment. In step S801, the LUT combining unit 105 receives information required for the LUT combining process from the LUT controller 103. In this case, the information required for the LUT combining process includes, for example, the 3D-LUT for the color matching process (LUT 601 shown in FIG. 6A), the 3D-LUT for the color separation process (LUT 602 shown in FIG. 6B), and the print mode such as a print quality input on the screen shown in FIG. 5. In step S802, the LUT combining unit 105 determines the number of grid points and grid point position information in the combined LUT from the input print mode. In this embodiment, the table shown in FIG. 9 is held in, for example, the LUT combining unit 105, which determines the number of grid points and grid point position information according to this table. For example, in FIG. 5, since the print quality (Quality) in the print mode is set to be "Standard", the number of grid points is determined to be "16", and the grid point position information is determined to be "0, 17, . . . , 255" with reference to the table shown in FIG. 9. The number of grid points of the combined LUT need only be larger than that of grid points of the LUT for the color matching process. In this embodiment, the number of grid points of the LUT for the color matching process is six. In step S803, the LUT combining unit 105 interpolates the LUT 601 shown in FIG. 6A to set the grid point position information determined in step S802 as the grid point positions of the input coordinate system. In this case, the LUT interpolation method may use a given method. For example, in this embodiment, the LUT is interpolated using the tetrahedral interpolation method. Alternatively, cubic interpolation or an interpolation method using polynomials with degree n may be used, or the interpolation methods may be switched depending on conditions.

In this case, upon LUT interpolation, serial processes for respective grid points are required. However, compared to processing to be executed for the entire image data, since a processing data amount for only the grid point position information of the LUT is greatly smaller, the influence on the processing time is small. When these serial processes are configured to be executed by software, and LUT application processes after the LUT combining process (to be described later) are configured to be executed by hardware, since the hardware need only process the combined LUT, the manufacturing cost of the apparatus can be suppressed. This embodiment is characterized not by increasing the number of grid points by the aforementioned interpolation process after the combining process of the plurality of LUTs but by increasing the number of grid points before the combining process. As a result, a conversion precision drop caused by combining the LUTs can be prevented.

As described above, the LUT holding unit 104 holds LUTs each having six grid points per axis, as exemplified in FIGS. 6A and 6B. In this embodiment, the LUT combining unit 105 executes the following LUT combining process using the grid point position information shown in FIG. 9.

If the print quality set on the UI 40 is "Standard", the number of grid points is determined to be 16 ("0, 17, . . . , 255") with reference to the table shown in FIG. 9. Therefore, finally, the total number of input values of the input coordinate system after the LUT combining process is 4096 (=16× 16×16) by setting these plurality of grid point position information in correspondence with R, G, and B values.

Figure 10A:
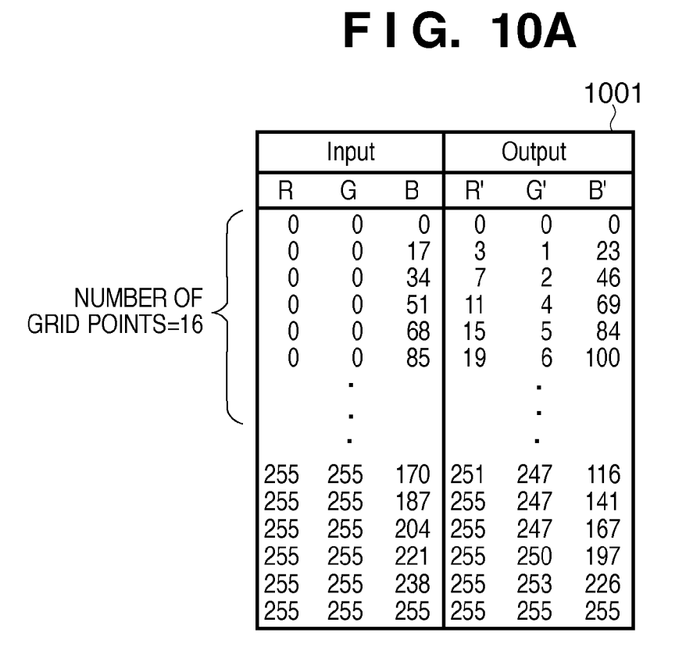
FIGS. 10A and 10B are views showing LUTs obtained by interpolating the 3D-LUTs based on 4096 input values.
Figure 10B:
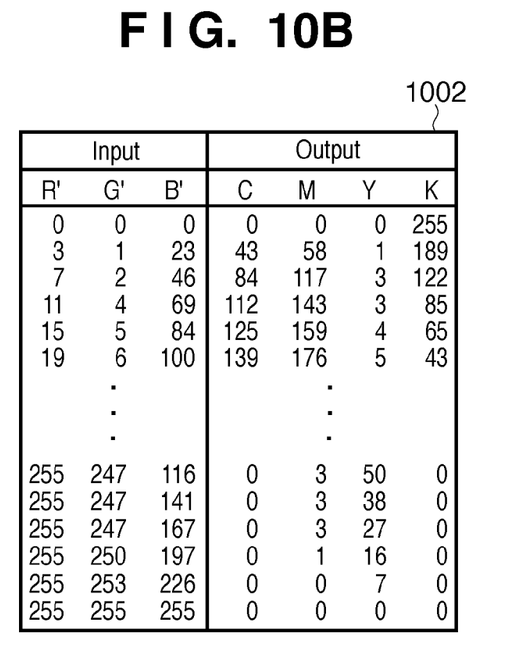

Initially, the 3D-LUT 601 for the color matching process shown in FIG. 6A is interpolated to have 4096 R, G, and B values, thereby generating an LUT 1001 shown in FIG. 10A (the first generation example in this embodiment). Then, as shown in the LUT 1001, (R, G, B)=(0, 0, 0) are converted into (R', G', B')=(0, 0, 0). Also, (R, G, B)=(0, 0, 17) are converted into (R', G', B')=(3, 1, 23) using tetrahedral interpolation. Next, color data as the output values of the LUT 1001 are input to the LUT 602 shown in FIG. 6B to obtain output values, thereby generating an LUT 1002 (third lookup table) shown in FIG. 10B (the third generation example in this embodiment). Then, for example, (R', G', B')=(0, 0, 0) are converted into (C, M, Y, K)=(0, 0, 0, 255), as shown in FIG. 10B. Also, (R', G', B')=(3, 1, 23) are converted into (C, M, Y, K)=(43, 58, 1, 189) using tetrahedral interpolation. Finally, the 4096 input values of the input coordinate system shown in FIGS. 10A and 4096 output values of the output coordinate system of the 3D-LUT 1002 for the color separation process are combined in association with each other (S804). As a result, an LUT 1101 shown in FIG. 11 is generated (the second generation example in this embodiment).

Figure 12:
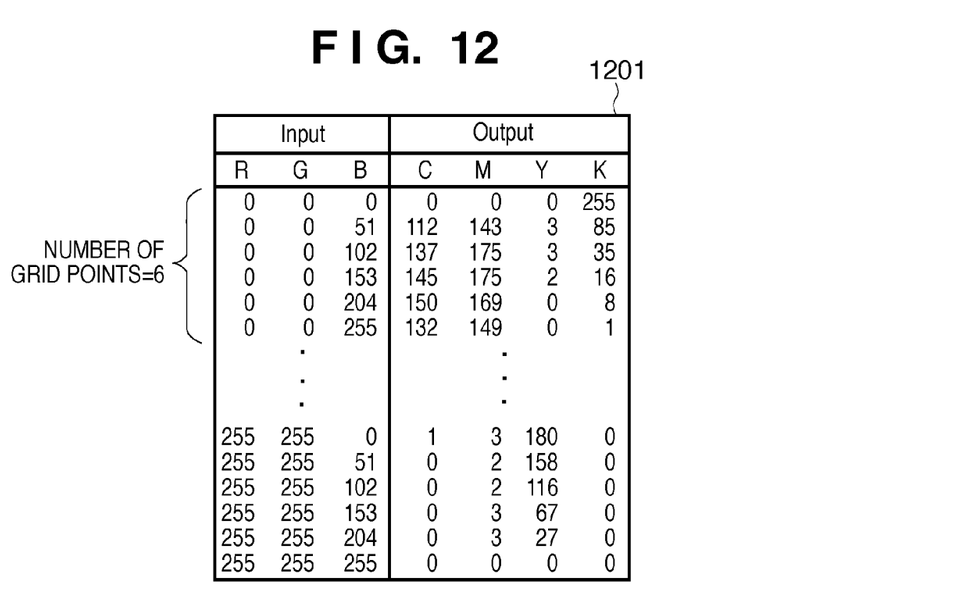
FIG. 12 is a view showing a combined LUT when the number of grid points is not changed.
Figure 13:
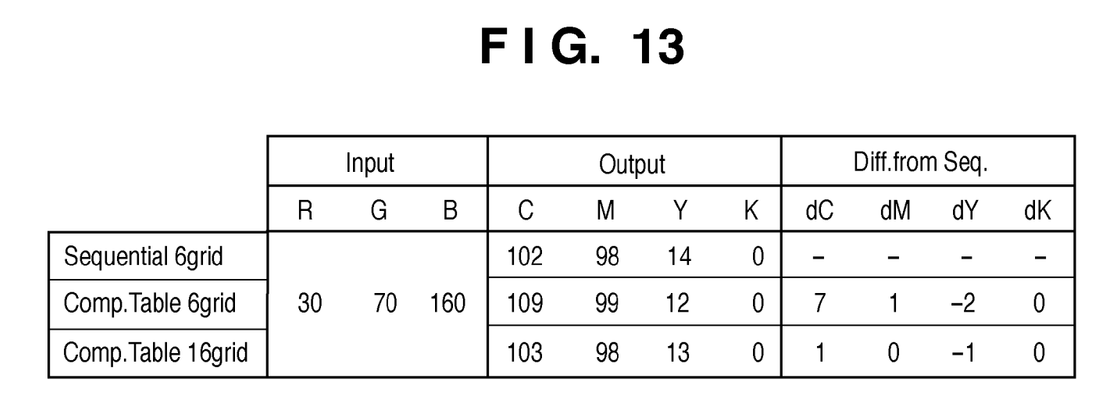
FIG. 13 is a table showing the comparison results of the precisions of color conversion processes.

FIG. 12 shows a combined LUT 1201 when the number of grid points is not changed (that is, the number of grid points remains set to be six). In this case, FIG. 13 is a table showing the comparison results of precisions of the color conversion processes in three different cases using, for example, input values (R, G, B)=(30, 70, 160). In one case, the color conversion processes are sequentially executed for image data without combining LUTs, as shown by "Sequential 6grid" in FIG. 13. In another case, the color conversion processes are executed using the combined LUT without changing the number of grid points, as shown by "Comp. Table 6grid" in FIG. 13. In still another case, the color conversion processes are executed using the combined LUT after the number of grid points is changed, as shown by "Comp. Table 16grid" in FIG. 13.

The result of the case "Sequential 6grid" indicates values obtained as a correct result, and (C, M, Y, K)=(102, 98, 14, 0) are obtained with respect to the input values (R, G, B)=(30, 70, 160). On the other hand, when the color conversion processes are executed using the combined LUT without changing the number of grid points, that LUT is an LUT including 6 grid points per axis, as shown in FIG. 12. With this LUT, (C, M, Y, K)=(109, 99, 12, 0) are obtained as output values corresponding to the input values (R, G, B)=(30, 70, 160). As a result, compared to the aforementioned output values (C, M, Y, K)=(102, 98, 14, 0), cyan, magenta, and yellow respectively suffer errors "+7", "+1", and "−2".

On the other hand, when the LUTs are combined after the number of grid points is changed as in this embodiment, output values (C, M, Y, K)=(103, 98, 13, 0) are obtained. As a result, compared to the aforementioned output values (C, M, Y, K)=(102, 98, 14, 0), cyan, magenta, and yellow respectively suffer errors "+1", "±0", and "−1", and the errors are greatly reduced.

As described above, according to this embodiment, since the number of grid points is determined from the table shown in FIG. 9, an arrangement having complicated functions like variable grid point processes need not be added. Also, the LUT (first lookup table) for the color matching process is interpolated to increase the number of grid points to be larger than that of grid points of that LUT, color material data as the output values from the LUT for the color separation process are calculated using the color data of the interpolated LUT as input values, and an LUT corresponding to the input values is generated in accordance with the output values, thereby combining the plurality of processes. Therefore, since the number of grid points is increased before the combining process, a conversion precision drop caused by combining LUTs having strong nonlinearities can be prevented. In this case, the number of input values need only be larger than that of grid points of the LUT, and need not be equal to the number of grid points increased by the interpolation process. Since color material data are calculated from the LUT for the color separation process based on the output color data of the interpolated LUT, a conversion precision drop caused when grid point intervals of one LUT are used upon combining LUTs having uneven grid point intervals can be prevented.

Also, in this embodiment, the two LUTs, that is, the 3D-LUT for the color matching process and that for the color separation process are combined. Furthermore, a 3D-LUT may be generated by combining a 1D-LUT (fourth lookup table) for the tone correction process executed after these processes. In this embodiment, a case in which one of a plurality of print modes is set, and the number of grid points to be interpolated is decided in accordance with the set print mode has been used. The present invention is not limited to this. Even if only one print mode is available, the aforementioned method is used, thereby reducing the size of the LUT stored in advance in the memory serving as a storage means. The aforementioned processes may be executed by a PC serving as a host, or a printing apparatus.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-262369, filed Nov. 17, 2009, which is hereby incorporated by reference herein in its entirety.

What is claimed is:

1. A lookup table generation method for generating a third lookup table by using a first lookup table and a second lookup table, comprising:

a first acquisition step of acquiring output values, using the first lookup table for converting color data on a device-independent color space into color data on a device-dependent color space, in accordance with input values the number of which is larger than the number of grid points of the first lookup table;

a second acquisition step of acquiring output values, using the second lookup table for converting the color data on the device-dependent color space into color material data corresponding to a plurality of color print materials, upon setting, as input values, the output values acquired in the first acquisition step; and a generation step of generating the third lookup table, having grid points a predetermined number of which is larger than the number of grid points of the first lookup table, corresponding to the predetermined number of input values in accordance with the output values acquired in the second acquisition step.

2. The method according to claim 1, wherein in the first acquisition step, the number of the input values, which is larger than the number of grid points of the first lookup table, is the predetermined number.

3. The method according to claim 1, wherein in the generation step, the third lookup table is generated by associating the predetermined number of input values with the output values acquired in the second acquisition step.

4. The method according to claim 1, further comprising:
a third acquisition step of acquiring output values, using a fourth lookup table for applying a tone correction process to the color material data corresponding to a plurality of color print materials, upon setting, as input values, the output values acquired in the second acquisition step,
wherein in the generation step, the third lookup table corresponding to the predetermined number of input values is generated in accordance with the output values acquired in the third acquisition step.

5. The method according to claim 1, further comprising:
a setting step of setting one of a plurality of print modes; and
a decision step of deciding the predetermined number based on the print mode set in the setting step.

6. The method according to claim 5, wherein the plurality of print modes include a plurality of print modes corresponding to different kinds of printing media.

7. An image processing method for applying color conversion processes to image data, comprising:
a generation step of generating a third lookup table by using a first lookup table and a second lookup table; and
a color conversion step of applying the color conversion processes to the image data using the third lookup table generated in the generation step,
wherein the generation step includes a first acquisition step of acquiring output values, using the first lookup table for converting color data on a device-independent color space into color data on a device-dependent color space, in accordance with input values the number of which is larger than the number of grid points of the first lookup table, a second acquisition step of acquiring output values, using the second lookup table for converting the color data on the device-dependent color space into color material data corresponding to a plurality of color print materials, upon setting, as input values, the output values acquired in the first acquisition step, and a generation step of generating the third lookup table, having grid points a predetermined number of which is larger than the number of grid points of the first lookup table, corresponding to the predetermined number of input values in accordance with the output values acquired in the second acquisition step.

8. An image processing apparatus which applies color conversion processes to image data, comprising:
a generation unit configured generate a third lookup table by using a first lookup table and a second lookup table; and
a color conversion unit configured to apply the color conversion processes to the image data using the third lookup table generated by said generation unit,
wherein said generation unit acquires first output values, using the first lookup table for converting color data on a device-independent color space into color data on a device-dependent color space, in accordance with input values the number of which is larger than the number of grid points of the first lookup table, acquires second output values, using the second lookup table for converting the color data on the device-dependent color space into color material data corresponding to a plurality of color print materials, upon setting the first output values as input values, and then generates the third lookup table, having grid points a predetermined number of which is larger than the number of grid points of the first lookup table, corresponding to the predetermined number of input values in accordance with the second output values.

9. The apparatus according to claim 8, further comprising a printing unit configured to execute a print process in accordance with the image data to which said color conversion unit has applied the color conversion processes.

* * * * *